US010286390B2

(12) United States Patent
Brandts et al.

(10) Patent No.: US 10,286,390 B2
(45) Date of Patent: May 14, 2019

(54) METHOD FOR PREPARATION OF A GROUP 4 METAL SILICATE AND USE THEREOF

(71) Applicant: BASF Corporation, Florham Park, NJ (US)

(72) Inventors: Jim Aloysius Maria Brandts, De Meern (NL); Lorianne Wagemaker, De Meern (NL)

(73) Assignee: BASF Corporation, Florham Park, NJ (US)

(*) Notice: Subject to any disclaimer, the term of this patent is extended or adjusted under 35 U.S.C. 154(b) by 0 days.

(21) Appl. No.: 15/674,795

(22) Filed: Aug. 11, 2017

(65) Prior Publication Data

US 2018/0015447 A1    Jan. 18, 2018

Related U.S. Application Data

(63) Continuation of application No. 14/785,184, filed as application No. PCT/IB2014/060755 on Apr. 16, 2014, now Pat. No. 9,764,315.

(30) Foreign Application Priority Data

Apr. 17, 2013  (EP) ...................................... 13164165

(51) Int. Cl.
*B01J 29/89*   (2006.01)
*B01J 35/00*   (2006.01)
(Continued)

(52) U.S. Cl.
CPC ............. *B01J 29/89* (2013.01); *B01J 35/002* (2013.01); *B01J 35/1019* (2013.01);
(Continued)

(58) Field of Classification Search
CPC ............... B01L 35/002; B01L 35/1014; B01L 35/1019; B01L 35/1038; B01J 29/89;
(Continued)

(56) References Cited

U.S. PATENT DOCUMENTS 4,581,292 A    4/1986  Shinpo et al.
5,053,139 A *  10/1991  Dodwell ................. B01J 39/14
                                                  210/688
(Continued)

FOREIGN PATENT DOCUMENTS

WO      2010101991     9/2010
WO   WO 2020/101991  *  9/2010  ............. C01B 33/00

OTHER PUBLICATIONS

Ramanathan et al., Synthesis and characterization of Zirconium incorporated ultra large pore mesoporous silicate, Zr-KIT-6, Microporous and Mesoporous Materials, 2013, pp. 207-212, vol. 167, Elsevier, New York, United States.
(Continued)

*Primary Examiner* — Yate' K Cutliff
(74) *Attorney, Agent, or Firm* — Lowenstein Sandler LLP

(57) ABSTRACT

The invention provides a method for the preparation of an amorphous silicate of at least one metal from the Group 4 of the Periodic Table of Elements with a total pore volume of at least 0.3 mL/g. The method of preparation involves the use of pore shaping conditions, which can be the use of a pore shaper and optionally an increased precipitation temperature, e.g. at least 60° C. The silicate of the invention is especially suitable in catalytic reactions such as esterifications, Michael additions, transesterifications, (ep)oxidations, hydroxylations, or in absorbance of small inorganic and organic molecules e.g. $CO_2$ or aromatic compounds.

13 Claims, 1 Drawing Sheet

(51) Int. Cl.
  *C02F 1/28*   (2006.01)
  *C01B 33/20*  (2006.01)
  *B01J 35/10*  (2006.01)
  *B01J 37/03*  (2006.01)
  *B01J 37/06*  (2006.01)
  *B01J 37/08*  (2006.01)
  *B01J 37/30*  (2006.01)
  *C11C 3/10*   (2006.01)
  *C02F 1/42*   (2006.01)
  *C02F 101/00* (2006.01)
  *C02F 101/20* (2006.01)
  *C02F 101/30* (2006.01)

(52) U.S. Cl.
  CPC ....... *B01J 35/1038* (2013.01); *B01J 35/1061* (2013.01); *B01J 37/031* (2013.01); *B01J 37/06* (2013.01); *B01J 37/08* (2013.01); *B01J 37/30* (2013.01); *C01B 33/20* (2013.01); *C02F 1/281* (2013.01); *C11C 3/10* (2013.01); *B01J 2229/18* (2013.01); *C02F 1/42* (2013.01); *C02F 2101/006* (2013.01); *C02F 2101/20* (2013.01); *C02F 2101/30* (2013.01)

(58) Field of Classification Search
  CPC ..... C01B 33/20; C11C 3/10; C02F 2101/006; C02F 1/281; C07C 67/02
  See application file for complete search history.

(56) References Cited

U.S. PATENT DOCUMENTS

| | | |
|---|---|---|
| 5,434,118 A | 7/1995 | Carati et al. |
| 5,508,457 A * | 4/1996 | Bayense ................. C07C 67/03 554/165 |
| 6,482,380 B1 * | 11/2002 | Nenoff ..................... B01J 39/10 210/681 |
| 2003/0089276 A1 | 5/2003 | Nishida et al. |

OTHER PUBLICATIONS

Shao, et al., Two step synthesis of a mesoporous titania-silica composite from titanium oxychloride and sodium silicate, Powder Technology, 2012, pp. 489-495, vol. 217, Elsevier, New York, United States.

International Preliminary Report on Patentability for PCT/IB2014/060755, dated Aug. 13, 2015, 20 pgs.

International Search Report for PCT/IB2014/060755, dated Jul. 21, 2014, 3 pgs.

Written Opinion of the International Preliminary Examining Authority for PCT/IB2014/060755 dated Apr. 16, 2015, 12 pgs.

* cited by examiner

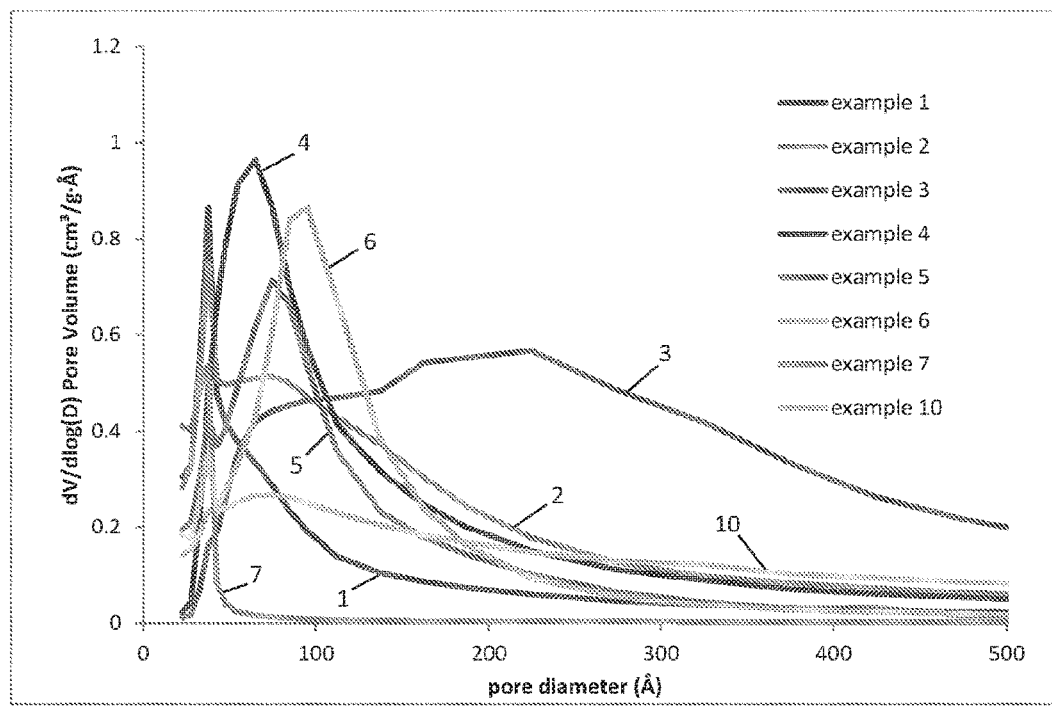

METHOD FOR PREPARATION OF A GROUP 4 METAL SILICATE AND USE THEREOF

The invention relates to amorphous mesoporous silicates useful in the area of catalysis and adsorption. In particular, the invention relates to a method for the preparation of a silicate of the Group 4 metals.

Silicates of transition metals, especially of the Group 4 elements, are known in the literature and often used in catalysis and adsorption.

For example, U.S. Pat. No. 5,508,457 describes a catalyst comprising at least one silicate of the Group 4 elements of the Periodic Table as the active component. In particular, titanium and titanium aluminium zeolites with a pore size 4-10 Å are described. Such catalysts are used in a process for the transesterification of carboxylic acid esters.

U.S. Pat. No. 5,053,139 describes amorphous titanium silicates and tin silicates. These can be used to remove lead from drinking water in the presence of competing ions normally found in drinking water. The cumulative desorption pore volume of the described silicates is in the range 0.03-0.25 mL/g and the average pore radius is less than 20 Å.

U.S. Pat. No. 5,434,118 describes a catalytically active amorphous gel consisting of silica matrix within which one or more metal oxides possessing catalytic activity are dispersed and having micropores with a mean pore diameter of 10 Å or less. U.S. Pat. No. 5,434,118 also describes that the gel is prepared by heating an aqueous solution of a tetra alkyl ammonium hydroxide, a silicon compound and one or more soluble metal compounds to form a gel, which is then dried and calcined.

WO 2010/101991 describes a method for preparing a metal silicate by mixing an acidic solution of a metal salt with a basic solution comprising a Lewis base and a metal compound selected from metal silicates and/or metal carbonates at a temperature of between 20 and 50° C. to produce a precipitate. Described metal silicates are inter alia amorphous titanium silicate, tin silicate, aluminium silicate, iron silicate, niobium silicate and zirconium silicate. These silicates are described as useful for the removal of heavy metals from an aqueous solution.

Shao et al., Powder Technology 217(2011)489-496 describes a two-step synthesis for preparing a mesoporous titania silica composite from titanium oxychloride and sodium silicate to produce a gel, which gel is subsequently aged, filtered and calcined. Shao et al. also describes that the composite produced is crystalline.

U.S. Pat. No. 4,581,292 describes a synthetic amorphous zirconium-bonded silicate and a method thereof, wherein the method comprises reacting an alkali metal silicate with zirconia salt and a mineral acid. U.S. Pat. No. 4,581,292 also describes that the silicate produced is microporous. Such a silicate is described as useful for dentifrice base material and as a filler in rubber.

Ramanathan et al., Microporous and Mesoporous Materials 167(2012)207-212 describes the synthesis of zirconium incorporated into a mesoporous silicate having a pore volume of 1.1 cm³/g. Also described is that low angle XRD revealed long range ordering of the materials produced.

Usually, known amorphous titanium silicates have pore volumes of below 0.3 mL/g and typically, about 0.1-0.2 mL/g or less. Traditional amorphous titanium silicates typically have an average pore diameter of less than 35 Å. Large pore volume and a large pore diameter are however advantageous as they are associated with a large adsorption capacity, improved adsorption kinetics and a higher catalytic activity.

An object of the present invention is to provide method for the preparation of a silicate of the Group 4 metals having improved physical properties, such as a large adsorption capacity and improved adsorption kinetics. Another object of the present invention is to provide a silicate of the Group 4 metals with improved catalyst properties such as selectivity, stability and activity, particularly in (trans)esterification reactions.

In order to address one or more of the foregoing desires, the present invention, in one aspect, provides an amorphous silicate with the general formula

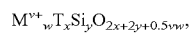

wherein M is selected from the group consisting of a proton, ammonium, a metal cation and combinations thereof, v is the valence of M being a positive integer, T is at least one of the Group 4 metals, x, y and w are molar ratios:
  x is 1;
  y is from 0.01 to 99;
  w is from 0.01 to 50; and
wherein said silicate has a total pore volume of at least 0.3 mL/g as measured by liquid nitrogen adsorption.

In another aspect, the invention provides a method for the preparation of the silicate according to the present invention, comprising the steps of;
  (a) providing a metal source of at least one metal of Group 4 and a silicate source in an aqueous medium;
  (b) carrying out a precipitation reaction by combining the metal and the silicate sources, whereby a substance of the metal silicate and a soluble salt are formed; and
  (c) drying the substance to remove water,
wherein the preparation is performed under pore shaping conditions.

In yet another aspect, the invention provides the use of the composition according to the invention or obtained in the method according to the invention, as a catalyst or catalyst support in a chemical reaction, or as an adsorbent.

The invention provides a silicate of at least one metal (T) from the Group 4 of the Periodic Table of Elements, with the general formula

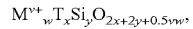

wherein M is selected from the group consisting of a proton, ammonium, a metal cation and combinations thereof, v is the valence of M being a positive integer, and x, y and w are molar ratios: x is 1, y is from 0.01 to 99, w is from 0.01 to 50.

The Group 4 of the Periodic Table of the Elements includes the metals such as Ti, Zr, Hf. Preferably, the metal T is titanium, zirconium or a mixture of titanium and zirconium, more preferably titanium. Under the term "a silicate" as used herein is understood a material comprising a Group 4 metal silicate, which may also comprise further components. These further components, which can include other salts or surfactants as described below in more detail, may for example be located in the pores of the silicate.

Preferably, the valence v of M is 1, 2, 3, 4, 5 or 6. In one preferred embodiment, v is 1, 2 or 3. In another preferred embodiment, v can be 5 or 6. When M is a metal cation or a mixture of metal cations, the metal is preferably from Group 1, 2, 13, 14, a transition metal, a lanthanide or an actinide. For the transition metals, the preferred groups are Group 3, 5, 6, 7, 8, 10, 11, 12, 13, and 14. In some embodiments, the metal is preferably selected from the group consisting of Pt, Pd, Gd, Hg, Cd, Au, Ho and combinations thereof. In another preferred embodiment, M is selected from the group consisting of a proton, ammonium, Na, Li, K, Cs, Ca, Mg, Sr, Ba, Fe, Sn, Ce, La, Nb, Ni, V, W, Mo, Al, Ag, Zn, Cu, Mn cations, and combinations thereof.

The values x, y and w are molar ratios and are in particular as follows: x is 1, y is from 0.01 to 99 and w is from 0.01 to 50. Preferably, y is in the range 0.1-10, more preferably, 0.2-5. Preferably, w is in the range 0.01-50, more preferably, 0.1-10.

The silicate of the invention is in the amorphous form. In a preferred embodiment, the compound of the invention is an amorphous titanium silicate or an amorphous zirconium silicate or an amorphous mixed silicate of titanium and zirconium. Amorphous titanium silicate is preferred. Under the term "amorphous" is understood X-ray amorphous, that is, a solid form with an X-ray powder diffraction pattern containing no crystalline diffraction peaks.

The silicate of the invention has a large total pore volume, typically at least 0.3 mL/g measured by liquid nitrogen adsorption. Preferably, the total pore volume is at least 0.4 mL/g, more preferably at least 0.45 mL/g. The total pore volume is measured by determining the volume of liquid nitrogen adsorbed at $P/P_0$ of approximately 1 using Micromeritics ASAP 2420.

The silicate of the invention further has a BET surface area of at least 50 m$^2$/g, preferably from 100 to 600 m$^2$/g, more preferably from 200 to 500 m$^2$/g. The BET surface area is measured by determining the amount of nitrogen adsorbed at 77 K and $P/P_0$ of approximately 0.3 and assuming a nitrogen cross sectional area of 16.2 Å$^2$, after degassing the sample at 180° C. on Micromeritics ASAP 2420.

Along with the increased pore volume, the silicate of the invention also has a larger average pore diameter, typically having mesopores and/or macropores, as classified by IUPAC 1994, which have pore diameters of 2-50 nm and >50 nm, respectively. Preferably, the average pore diameter is at least 40 Å, more preferably at least 50 Å, yet more preferably at least 60 Å. The average pore diameter can be as high as 100 Å, or even higher. In a preferred embodiment, the average pore diameter is 40-150 Å. The average pore diameter is determined by dividing the total pore volume by the BET surface area, and assuming that the pores are cylindrical. The BJH method is used to calculate the pore distributions from experimental isotherms using the Kelvin model of pore filling.

A large pore volume is usually obtained at the expense of the surface area. Normally, the higher the pore volume and the pore diameter, the lower the surface area, and a higher surface area is usually attributed to smaller pores. The desired pore volume can be determined by the end application of the material, for example by the size of the molecules that need to be accommodated during a particular chemical reaction when used as a catalyst. According to the present invention the pore size, pore volume and the surface area of the Group 4 metal silicates can be controlled, and a silicate with desired pore characteristics and a surface area for a particular end-use application, can be prepared.

The silicate of the invention has further improved properties such as the Lewis and Brønsted acidity as well as the thermal stability and adsorption properties, which can be controlled by the preparation method.

The silicate of the invention may comprise further components, which depend on the preparation method.

In some embodiments, the silicate comprises a pore shaper used during the preparation of the silicate. After drying, the pore shaper is preferably present in the pores of the silicate of the invention. Without wishing to be bound by any theory, the pore shapers used in the present invention are believed to contribute to the formation of larger pores during the drying step. After the pores are formed, the pore shaper is preferably removed from the pores, e.g. by washing with sufficient amounts of water, or in some cases by calcination.

In some of the embodiments, the pore shaper is a soluble salt. In one such embodiment, the salt formed during the precipitation reaction is used as a pore shaper. Preferably, the salt is a soluble salt of an alkali metal. More preferably, the salt is a halide, such as fluoride, chloride, bromide or iodide, for example NaCl, KCl, NaF, KF, NaBr, KBr, NaI or KI. In an another embodiment the salt is a non-halide, e.g. a sulfate, nitrate or phosphate, e.g. $Na_2SO_4$, $KNO_3$ or $(NH_4)_2PO_4$. Also organic salts can be used, for example a formate, acetate or citrate.

In another embodiment, the soluble salt is a salt which can be decomposed upon heating (thermo-decomposable salt). Preferably, the salt is of an alkali metal, an earth-alkali metal or ammonium. More preferably, carbonates, bicarbonates, nitrates and nitrites are used. Suitable salts are for example $Na_2CO_3$, $NaHCO_3$, $K_2CO_3$, $KHCO_3$, $NaNO_2$ and $KNO_2$. Also organic salts like formates, acetates and citrates can be used. It is believed by the inventors that the gaseous components released during the decomposition of these salts may contribute to the formation of the pores with a larger pore volume. For examples, carbonate and organic salts usually produce $CO_2$ on thermal decomposition, while nitrate and nitrite salts may produce for example $NO_x$ and/or oxygen.

In yet another embodiment, the pore shaper present in the silicate of the invention is a surfactant. Suitable surfactants are anionic surfactants (sulfates, sulfonates, phosphate esters, carboxylates, halides), cationic surfactants (ammonium, pyridinium, triethanol amines, alkaline-, alkaline earth- and transition metals) and non-ionic (like higher alcohols, i.e. higher than $C_6$, such as $C_6$-$C_{26}$, and glucoside alkyl ethers and esters). Preferably quaternary ammonium salts are used. Good results are achieved with hexadecyl(2-hydroxyethyl)dimethyl ammonium dihydrogenphosphate (HHDMA).

In a further embodiment, the pore shaper present in the silicate of the invention is a metal other than the Group 4 metals. These other metals can either be present in the oxide framework ("built-in") together with the silicon and the Group 4 metal atoms, or be outside the oxide framework, e.g. introduced through ion exchange. Examples of the "built-in" metals are group 3 (e.g. La), 5, 6, 7 and 14 (e.g. Sn) metals. The metals that can be present outside the oxide framework are for example the cations of alkaline metals with valence 1, preferably Na$^+$, K$^+$, Li$^+$ or transition or alkali-earth metals with valence 2 or 3, preferably Sn$^{2+}$, Ba$^{2+}$, La$^{3+}$. Instead of or together with a metal, the cation can also be a proton or ammonium. In a preferred embodiment, the cation M is selected from the group consisting of a proton, ammonium, Na, Li, K, Cs, Ca, Mg, Sr, Ba, Fe, Sn, Ce, La, No, Ni, V, W, Mo, Al, Ag, Zn, Cu, Mn, Pt, Pd, Gd, Hg, Cd, Au, Ho cations, and combinations thereof. If a metal possesses different oxidation states, the respective metal cations can also be used, such as Fe(II), Fe(III), Sn(II), Sn(IV).

In a preferred embodiment, the silicate of the invention has been calcined at a temperature of at least 200° C., more preferably at least 300° C., yet more preferably at least 400° C.

In another aspect, the invention provides a method for the preparation of an amorphous silicate of the Group 4 metal with a large total pore volume, preferably at least 0.3 mL/g. Preferably the metal is titanium and/or zirconium, more preferably titanium.

The present inventors have found that amorphous silicates of the Group 4 metals with a large total pore volume can be obtained under pore shaping conditions. According to the present invention, these pore shaping conditions are selected from the group consisting of the use of certain additives (pore shapers), certain process conditions that are used during the preparation of the silicates, and a combination thereof.

The preparation of the silicates of the Group 4 metals according to the invention includes a precipitation reaction in an aqueous medium wherein a substance of the metal silicate is formed together with a soluble by-product salt. Typically, the precipitation reaction involves combining a metal source with a silicate source in an aqueous medium, wherein they are both soluble. Preferably, the aqueous medium is an aqueous solution. As a metal source, salts such as halides e.g. chloride, bromide, fluoride, iodide or alkoxides are particularly suitable. Preferred alkoxide is isopropoxide. Also non-halide salts such as nitrates, phosphates, sulfates can be used. As a titanium source, preferably $TiCl_4$, titanium(IV) oxychloride, titanium(IV) bromide, titanium(IV) fluoride, titanium(IV) iodide, titanium(IV) alkoxides and TiO-alkoxides such as titanium isopropoxide (TIP), are used. Also Ti(III) compounds may be used. The silicate source is preferably a soluble metal silicate such as an alkali metal silicate or an organic silicate such as alkoxide, preferably tetraethyl orthosilicate (TEOS).

The precipitation reaction in step (b) is preferably carried out at a neutral pH. More preferably, the pH is in the range 7-8.5, yet more preferably in the range 7.5-7.9. It was found that at this neutral pH the BET surface area of the resulting silicate is the highest.

In the present invention, the method of preparation involves the use of pore shaping conditions which consists of a pore shaper used during the preparation of the silicate, and optionally an increased precipitation temperature, e.g. at least 60° C. Without wishing to be bound by any theory, it is believed by the inventors that the pore shaping conditions presented herein results in an increased pore volume and pore size of the resulting metal silicates.

Preferably, the pore shaper is a soluble salt of M, wherein M is selected from the group consisting of a proton, ammonium, a metal cation and combinations thereof. More preferably, v is 1, 2, 3, 4, 5 or 6, yet more preferably 1, 2 or 3. In another preferred embodiment, v can be 4, 5 or 6. In a preferred embodiment, M is selected from the group consisting of a proton, ammonium, Na, Li, K, Cs, Ca, Mg, Sr, Ba, Fe, Sn, Ce, La, Nb, Ni, V, W, Mo, Al, Ag, Zn, Cu, Mn cations and combinations thereof. If a metal possesses different oxidation states, the respective metal cations can also be used, for example Fe(II), Fe(III), Sn(II) Sn(IV).

In one embodiment of the invention, the pore shaper is the salt formed during the precipitation reaction as a by-product. The same salt can also be added from an external source, before, during or after the precipitation reaction in step (b), but in any case before the drying in step (c). The formed salt and/or the added salt are allowed to accumulate in the silicate during drying of the metal silicate substance. According to this embodiment, no washing step is performed before drying as the salt is allowed to accumulate in the metal silicate substance. The method of this embodiment thus omits a washing step that is usually performed in conventional metal silicate preparation after the precipitation and before the drying step. The salt is preferably a soluble salt of an alkali metal. More preferably, it is a halide of an alkali metal. Suitable halides are for example NaCl, KCl, NaF, KF, NaBr, KBr, NaI or KI. The salt formed as a by-product can also be a non-halide, such as nitrates, sulfates, phosphates, or organic salts like formates, acetates and citrates. The amounts of the added salt can be chosen from a wide range, e.g. between 1 and 400 wt. % relative to the final dried material. By varying the amounts and the kind of salt, the pore structure of the resulting material can be varied. After the material is dried, it can be reslurried again and washed to remove the salt. The removal of the salt can be controlled by measuring the conductivity of the demiwater used for washing. Typically, a conductivity of below 50 μS/cm is sufficient.

If a halide is used during the precipitation reaction as the metal source, it necessarily follows that a halide salt is formed as a by-product. If the halide salt is allowed to accumulate in the silicate of the invention according to the above embodiment, it may be preferred to replace it, either at least partially or completely (e.g. 99 wt. % is replaced), with a non-halide salt before drying. Preferably, the non-halide salt is selected from the group consisting of phosphate, biphosphate, phosphite, biphosphite, sulfate, bisulfate, sulfite, bisulfite, nitrate, nitrite, carbonate, bicarbonate, formate, acetate and citrate. Examples of suitable salts are $Na_2SO_4$, $KNO_3$ or $(NH_4)_2PO_4$. Replacement with non-halides can be advantageous since halides may lead to the corrosion of equipment during drying, if no special measures are taken. The replacement can be performed by treating with a concentrated solution, and preferably with a saturated solution, of a non-halide salt. The removal of the halide such as a chloride ion can be monitored by a test using $AgNO_3$. The silicate is then dried with the non-halide salt that is allowed to accumulate in the pores.

However, on the other hand, if a non-halide salt is formed during the precipitation reaction as the by-product it may, in some cases, be desired to replace it with a halide salt before drying, such as a chloride, fluoride or bromide. Similarly, a non-halide salt formed during the precipitation reaction as the by-product can be replaced by another non-halide salt $NO_3$ replaced by $SO_4$), either at least partially or completely (e.g. 99 wt. % is replaced). The same applies to a halide salt that can be replaced by another halide salt.

In some embodiments, the obtained metal silicate substance may be washed to remove the salt formed during the precipitation. However, in other embodiments, it is preferred not to wash the salt away but allow it to accumulate in the metal silicate during the drying step. This will be described in more details in the specific embodiments herein-below.

In yet another embodiment of the invention, the pore shaper is a thermo-decomposable salt, preferably of an alkali metal, an earth-alkali metal or ammonium. Preferably the salt is a carbonate, a bicarbonate, a nitrate or a nitrite. More preferably, the salt is a bicarbonate such as $NaHCO_3$. Also organic salts like a formate, acetate or citrate can be used. The thermo-decomposable salt can be added before, during or after the precipitation reaction, as long as it is added before the drying step. In this embodiment no washing step before drying is performed, as the thermo-decomposable salt is allowed to be accumulated in the pores during drying. The drying step should be at a temperature sufficient to cause the decomposition of the salt. While this temperature depends on the salt used, generally, the drying temperature is preferably above 70° C., more preferably above 90° C. After drying, however, the material can be washed to remove the remainders of the salt from the pores and dried again.

In a further embodiment of the invention, the pore shaper is a surfactant. Suitable surfactants are anionic surfactants (sulfates, sulfonates, phosphate esters, carboxylates, halides), cationic surfactants (ammonium, pyridinium, triethanol amines, alkaline-, alkaline earth- and transition metals) and non-ionic (like higher alcohols, i.e. higher than $C_6$, e.g. $C_6$-$C_{26}$, and glucoside alkyl ethers and esters). Preferably quaternary ammonium salts are used. Good results are achieved with hexadecyl(2-hydroxyethyl)dimethyl ammonium dihydrogenphosphate (HHDMA). The surfactant can be added before, during or after the precipitation reaction, as long as it is added before the drying step. The amount of the surfactant used can be chosen from a wide range, e.g. 0.1-400 wt. % relative to the final dried material, more preferably 1-100 wt. %. The surfactant can be (at least partially) removed by washing and can be completely removed by calcination, e.g. at 450° C.

In another embodiment of the present invention, the pore shaper is a salt of a cation selected from the group consisting of a transition metal cation other than the Group 4 metals, an alkali metal cation, an earth-alkali metal cation, a proton, ammonium and combinations thereof. Good results for a large pore volume are particularly obtained for the metals being Sn, Ba, La, Ag, Ca or Mg. However other metals such as those listed for M are also suitable. In this embodiment, the ions are preferably added after the precipitation but before the drying step. The metal cations are added in the form of a soluble salt, preferably a halide, nitrate, carbonate or sulfate. The salt can also be a phosphate, biphosphate, phosphite, biphosphite, sulfate, bisulfate, sulfite, bisulfite, nitrate, nitrite, carbonate or bicarbonate. Alternatively organic salts could be used such as formates, citrates and acetates. Particularly suitable salts are chlorides, e.g. $SnCl_2$, $BaCl_2$ and $LaCl_3$. Other examples of suitable salts are sulfates, like $SrSO_4$. The metal cations can suitably be added to the substance by reslurrying of the obtained substance in a solution of the desired salt.

A particularly preferred embodiment wherein metal cations are used as the pore shaper is as follows. The metal silicate substance is obtained as described above in steps (a) and (b), and washed to remove the salt formed during the precipitation. The removal of the salt from the substance can be controlled by measuring the conductivity of the demi-water used to wash the precipitated substance. Typically, a conductivity of below 50 μS/cm is sufficient. After that, the substance is reslurried in a solution of a salt with the desired metal cation, which can conventionally be done by stirring. Preferably, during stirring elevated temperatures such as at least 70° C. are used. The slurry is then filtered and washed with demi-water until no salt is detected by the conductivity test described above. Thereafter, the obtained precipitate is dried according to step (c) of the method of the invention.

Alternatively or in combination with the preceding embodiments, the silicate of the invention can be obtained by a process wherein the process conditions are changed during precipitation. In this embodiment, the temperature during the precipitation step is preferably at least 60° C., more preferably at least 70° C., most preferably at least 80° C. This can suitably be done by heating of the both metal and silicate sources in the aqueous medium, before they are combined in step (b).

The obtained metal silicate substance is then dried to remove water. Drying is preferably performed at temperatures above 100° C. but can also be done at room temperature, preferably in air or in a nitrogen flow. The silicates obtained after drying can already be used as such.

The water from the silicate substance can also be removed by calcination. Alternatively, calcination can be done after the water is removed by drying. Calcination at higher temperatures may make the silicate material more active as a catalyst. Preferably, the calcination is carried out at a temperature of at least 200° C., more preferably at least 300° C., yet more preferably at least 400° C. Calcination is also preferred when the material is used to make tablets using a lubricant. This lubricant (preferably, hydrogenated fats or graphite) is burned off during the calcination without effecting the amorphous character of the silicate structure. The calcination is also preferably conducted when a thermo-decomposable salt or a surfactant is used as a pore shaper. In this case, the calcination also burns off (at least part of) the pore shapers present in the pores after the preparation, while preserving the pore volume of the silicate material of the invention.

After drying, the silicate of the invention in some embodiments may contain a pore shaper in the pores. Preferably, the pore shaper is then removed from the metal silicate in a washing step. For that, the dried material can be reslurried in water at room temperature and washed until no soluble salts are present in the washing water. The removal of the salt can be controlled by measuring the conductivity of the demi-water used for washing. Typically, a conductivity of below 50 μS/cm is sufficient. Alternatively, as described above, some pore shapers may be removed by calcination.

The silicate of the invention can also be subjected to ion exchange with cations. The step of ion exchange can be carried out before or after drying, or after calcination, if performed. The cations may be introduced in the structure in order to improve activity and/or selectivity of the resulting material in catalytic reactions. The ion exchange is preferably performed with the cations as recited for M above. The ion exchange and the washing step described herein-above may be done in separate steps or may be combined in one step.

The fact that the preparation procedure as described above leads to a larger pore volume and larger pores in amorphous Group 4 silicates is not evident, because it is generally difficult to predict how particular salts or process conditions affect the formation of a particular metal silicate precipitate. As an example, in nickel catalysts an opposite effect can be found, wherein higher precipitation temperatures and the use of salts can in some cases yield smaller pore volumes and pore diameters.

In addition, the present inventors have found that the metal silicates obtained by the method of the invention not only have a large pore size, but are also more active in catalytic reactions e.g. conversion of triglycerides with methanol to fatty acid methyl esters. Also the material of the invention is more active in the esterification of free fatty acids with methanol to form fatty acid methyl esters.

The material according to the present invention can be used in a variety of applications. This material is especially suitable in catalytic reactions such as esterifications, Michael additions, transesterifications, (ep)oxidations and hydroxylations. The metal silicate of the present invention is preferably used as a catalyst or catalyst support, as such or after modification by ion exchange. The material of the invention can also be used as an ion exchanger. Further uses of the silicate of the invention are for the adsorbance of small inorganic and organic molecules e.g. $CO_2$ or aromatic compounds.

Another preferred use of the silicate of the invention is their use for the adsorption and/or removal of radionuclides, preferably Sr (particularly $^{90}$Sr) or actinides, from aqueous solutions. The material of the invention can therefore be used as a sorbent for the treatment of metal-contaminated waste streams and ground waters.

A further use of the material of the invention is for the selective adsorption and desorption of metals under physiological conditions, preferably selected from the group consisting of Pt, Pd, Gd, Hg, Cd, Au, Ho cations and combinations thereof. If a metal possesses different oxidation states, the respective metal cations can also be used, for example Pt(II) and Pt(IV) cations. Under the term "physiological conditions" is understood an aqueous solution at physiological pH, which is typically 7.3.

The material of the invention can be used in the form of a powder, tablet, granules, extrusions, etc. It can be used as bulk material or on a support. Preferably, the silicate of the invention is in the form of tablets or extrudates which are particularly useful in fixed bed applications.

The invention will now be illustrated in the following, non-limiting examples. Where percentages or parts are mentioned, the weight percentages or parts by weight, respectively, are meant unless stated otherwise.

BRIEF DESCRIPTION OF THE FIGURES

The FIGURE is a graph of pore diameter (Å) vs. dV/dlog (D) pore volume (cm3/g-Å) for each of Examples 1-10.

EXAMPLES

General

Physical adsorption of nitrogen at −196° C. using a Micromeritics ASAP 2420 apparatus was used to determine the textural properties of the example including the pore volume, pore size distribution, average pore diameter and the BET surface. The BET surface area and pore size distributions were determined by BET and BJH methods, respectively. The presence of micropores was determined from a t-plot analysis. Prior to the measurements, all samples were degassed under vacuum until a pressure lower than 10 μm Hg at 180° C.

Powder X-ray diffraction (XRD) patterns were obtained with a Bruker D8 ADVANCE (Detector: SOL'X, Anode: Copper, wavelength: 1.542 Å, Primary Soller slit: 4°, Secundary Soller slit: 4°, Detector slit: 0.2 mm, Spinner: 15 RPM, Divergence slit: variable V20, Antiscatter slit: variable V20, Start: 10° 2 theta, Stop: 100° 2 theta, Stepsize: 0.05° 2 theta, Time/step: 8 sec, Sample preparation: Front loading).

Example 1

TiSi Without Washing

In a vessel containing 95 g of demi-water there were dissolved 36 g of a 30% NaOH solution, 13.6 mL of a 27% $Na_2SiO_3$ solution. The solution in this vessel is called solution A. In another vessel containing 110 g of demi-water, 17 mL of a 35% $TiOCl_2$ solution was added. The solution in this vessel is called solution B. Then, solution A is added to solution B in 5 minutes with vigorous stirring. After the addition is complete, the mixture is allowed to continue mixing for an additional 10 minutes. The pH of the solution should fall between 7.5 and 7.9; if necessary, the pH is adjusted with dilute HCl or dilute NaOH. The sample is then allowed to age for at least 4 hours. The slurry was filtered and the remaining substance was dried in the oven overnight at 110° C. The resulting white solids were granulated, sieved through a 400 μm sieve, reslurried in water and stirred for 1 h at a pH 2.00 using diluted nitric acid. Subsequently, the slurry was filtered, washed with demi-water until the conductivity of the wash water was below 50 μS/cm. The resulting white material was dried in the oven overnight at 110° C. Approximately 12 grams of white solids were produced by this method.

The resulting material was amorphous by XRD and had a Na:Ti:Si molar ratio 0.05:1:0.95, a total pore volume 0.33 mL/g, BET-SA 403 m$^2$/g, average pore diameter 46 Å.

Example 2

Addition of Extra NaCl

A similar procedure as described in Example 1 was used but to solution B 10 g of NaCl was added before the precipitation. After the mixing of solutions A and B and pH adjustment, the resulting precipitate was filtered and dried at 110° C. overnight. Then the material was granulated to below 400 microns, reslurried in water and stirred for 1 h at room temperature. Then the slurry was filtered, washed until the conductivity was below 20 μS/cm. The resulting white material was dried in the oven overnight at 110° C. Approximately 14 grams of white solids were produced by this method. The resulting material was amorphous by XRD and had a Na:Ti:Si molar ratio 0.36:1:0.96, a total pore volume 0.54 mL/g, BET-SA 389 m$^2$/g, average pore diameter 59 Å.

Example 3

Addition of $NaHCO_3$

A similar procedure as described in Example 1 was used but now right after the completion of mixing solution A and B and pH adjustment to 7.5, 20 g of $NaHCO_3$ was added to the slurry. The resulting precipitate was filtered and dried at 110° C. overnight. Then the material was granulated to below 400 microns, reslurried in water and stirred for 1 h at room temperature. Then the slurry was filtered, washed until the conductivity was below 20 μS/cm. The resulting white material was dried in the oven overnight at 110° C. Approximately 13.5 g of white solids were produced by this method. The resulting material was amorphous by XRD and had a Na:Ti:Si molar ratio 0.38:1:0.94, a total pore volume 0.53 mL/g, BET-SA 170 m$^2$/g, average pore diameter 118 Å.

Example 4

Addition of HHDMA

A similar procedure as described in Example 2 was used, except that the 10 g of NaCl were replaced by 20 mL of hexadecyl(2-hydroxyethyl)dimethyl ammonium dihydrogenphosphate solution in water (30%). The work-up of the resulting precipitate was similar to Example 2. The resulting material was amorphous by XRD and was calcined at 450° C. The calcined material was also amorphous and had a Na:Ti:Si molar ratio 0.38:1:0.94, a total pore volume 0.50 mL/g, BET-SA 238 m$^2$/g, average pore diameter 69 Å.

Example 5

Addition of $BaCl_2$

A similar procedure as described in Example 1 was used up to the part of the ageing of the precipitate. Then the precipitate was washed with demi-water until the conductivity was below 50 μS/cm. The resulting substance was reslurried in 200 mL demi-water and 26.2 g of barium chloride was added as a solid. The resulting slurry was heated to 80° C. and stirred for an additional 90 minutes. Then the slurry was filtered and washed with demi-water until no Cl could be detected (by AgNO$_3$ addition). The resulting substance was dried in an oven overnight at 105° C. The resulting material was amorphous by XRD and had a Na:Ti:Si molar ratio 0.00:1:0.61, contained 17 wt % Ba and had a total pore volume of 0.40 mL/g, BET-SA 330 m$^2$/g, average pore diameter 60 Å.

Example 6

Use of High Temperatures During Precipitation

A similar procedure as described in Example 1 but now solution A and B were heated to 80° C. before they were mixed. After ageing, the resulting precipitate was washed with demi-water until the conductivity was below 50 µS/cm. The precipitate was dried in an oven at 110° C. overnight. The resulting dried material was amorphous by XRD and had a Na:Ti:Si molar ratio 0.27:1:0.49, a total pore volume 0.40 mL/g, BET-SA 262 m$^2$/g, average pore diameter 71 Å.

Example 7 (Comparative)

Comparative TiSi Preparation

Titanium silicate powder was made in accordance with Example 9 of U.S. Pat. No. 5,053,139. Two liters of a 1.5 M titanium chloride solution (solution A) were made by adding 569.11 g TiCl$_4$ to enough deionized water to make 2 liters. Two liters of 1.5M sodium silicate solution (solution B) are made by dissolving 638.2 g of Na$_2$SiO$_3$.5H$_2$O in enough 3M NaOH to make 2 liters. Solution B is added to solution A at a rate of 16 cc/minute with extremely vigorous stirring. After addition is complete, the mixture is allowed to continue mixing for an additional 15 minutes. The pH of the solution should fall between 7.5 and 7.9; if this is not the case, the pH is adjusted with dilute HCl or dilute NaOH, The sample is then allowed to age 2-4 days. After aging, any water on top of the substance is decanted off. The sample is then filtered, washed with 1 liter deionized water per liter of substance, reslurried in 4-6 liters of deionized water, filtered, and finally rewashed in 2 liters of water per liter of substance.

For efficiency reasons, the sample was then dried at 105° C. for 24 hours (until LOI is below 10). At no time during the synthesis procedure is the substance allowed to contact any metal; polypropylene and glass labware are used throughout the preparation.

The solids produced from this method were granulated and sieved to particles below 400 micron and the resulting material had a silicon-to-titanium molar ratio of 1:1 and a total pore volume around 0.14 mL/g, BET-SA 364 m$^2$/g, average pore diameter 31 Å. The resulting material was amorphous by XRD.

Example 8

Use of TiSi in Transesterification 0.2 grams of TiSi material from Example 7 was placed in a 20 mL vial. To this a mixture of refined rapeseed oil (8.9 mL) and n-butanol (6.1 mL) was added. The mixture was heated to 110° C. for 20 h. After 20 h, the reaction mixture was analysed by GC. The reaction product showed 20.7% conversion of the rapeseed oil. A comparative reaction without a catalyst showed only 1.2% conversion.

Example 9

Use of Large Pore TiSi in Transesterification 0.2 grams of TiSi material from Example 6 was placed in a 20 mL vial. To this a mixture of refined rapeseed oil (8.9 mL) and n-butanol (6.1 mL) was added. The mixture was heated to 110° C. for 20 h. After 20 h, the reaction mixture was analysed by GC. The reaction product showed 53.5% conversion of the rapeseed oil. A comparative reaction without a catalyst showed only 1.2% conversion.

Example 10

Removal of Halides with Na$_2$SO$_4$

A similar procedure as described in Example 1 was used, but after ageing the slurry was filtered and the remaining substance was washed with a Na$_2$SO$_4$ solution in demi-water (200 g Na$_2$SO$_4$ in 1000 mL demi-water). Analysis of the collected wash water showed that virtually all of the chloride was removed from the wet filter cake. The remaining white Cl-free material was dried in the oven overnight at 110° C. The resulting white solids (39.6 g) were granulated, sieved through a 400 µm sieve, reslurried in 250 mL water and stirred for 3 h at a pH 2.00 using diluted nitric acid. Subsequently, the slurry was filtered, washed with demi-water until the conductivity of the wash water was below 50 µS/cm. The resulting white material was dried in the oven overnight at 110° C. Approximately 12 grams of white solids were produced by this method.

The resulting material was amorphous by XRD and had a Na:Ti:Si molar ratio 0.05:1:0.95, a total pore volume 0.31 mL/g, BET-SA 324 m$^2$/g, average pore diameter 68 Å.

Example 11

Use of Na$_2$SO$_4$ Washed TiSi in Transesterification 0.2 grams of TiSi material from Example 10 was placed in a 20 mL vial. To this, a mixture of refined rapeseed oil (8.9 mL) and i-decanol (8.0 mL) was added. The mixture was heated to 140° C. for 24 h. After 24 h, the reaction mixture was cooled to room temperature and was analysed by GC. The reaction product showed 34.3% conversion of the rapeseed oil. A comparative reaction with the catalyst from Example 7 showed only 17.9% conversion. A comparative experiment without a catalyst showed only 8.0% conversion.

The invention claimed is:

1. A catalyst or adsorbent composition comprising a mesoporous and/or macroporous amorphous Group 4 metal silicate of formula

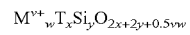

wherein

M is selected from the group consisting of a proton, an ammonium, a Na, Li, K, Cs, Ca, Mg, Sr, Ba, Fe, Sn, Ce, La, Nb, Ni, V, W, Mo, Al, Ag, Zn, Cu or Mn cation and combinations thereof, v is the valence of M being a positive integer, T is at least one of the Group 4 metals, and x, y and w are molar ratios, wherein x is 1;

y is from 0.01 to 99; and w is from 0.01 to 50; and wherein said silicate has a total pore volume of at least 0.3 mL/g as measured by liquid nitrogen adsorption and wherein the composition is in the form of a powder, tablet, granule or extrudate.

2. The composition according to claim 1, wherein M is selected from the group consisting of Na, Li and K cations, and combinations thereof.

3. The composition according to claim 1, wherein T is selected from the group consisting of Ti, Zr and Hf, and mixtures thereof.

4. The composition according to claim 1 in the form of a tablet or extrudate.

5. A method of performing a chemical reaction under catalytic conditions, the method comprising employing the composition according to claim 1 as a catalyst.

6. The method according to claim 5 wherein the chemical reaction is an esterification, Michael addition, transesterification, oxidation, epoxidation or an hydroxylation.

7. The method according to claim 5 wherein the chemical reaction is a transesterification.

8. A method for adsorption and/or removal of radionuclides from a contaminated aqueous stream, the method comprising contacting the stream with the composition of claim 1.

9. The method according to claim 8 wherein the radionuclides are selected from the group consisting of Sr and actinides.

10. A method for selective adsorption and desorption of metal cations under physiological conditions, the method comprising contacting an aqueous solution at physiological pH with the composition of claim 1.

11. The method according to claim 10, wherein the metals are selected from the group consisting of Pt, Pd, Gd, Hg, Cd, Au, Ho and combinations thereof.

12. The composition according to claim 1, wherein the silicate has a total pore volume of at least 0.4 mL/g.

13. The composition according to claim 1, wherein the silicate has a total pore volume of at least 0.45 mL/g.

* * * * *